(12) United States Patent
Goeb (10) Patent No.: US 10,606,813 B2
(45) Date of Patent: Mar. 31, 2020

(54) SYSTEMS AND METHODS FOR SECURELY MANAGING PROGRAM EXECUTION

(71) Applicant: Roger H. Goeb, North Las Vegas, NV (US)

(72) Inventor: Roger H. Goeb, North Las Vegas, NV (US)

(*) Notice: Subject to any disclaimer, the term of this patent is extended or adjusted under 35 U.S.C. 154(b) by 242 days.

(21) Appl. No.: 15/593,773

(22) Filed: May 12, 2017

(65) Prior Publication Data

US 2018/0330094 A1 Nov. 15, 2018

(51) Int. Cl.
*G06F 9/445* (2018.01)
*G06F 21/51* (2013.01)
*G06F 16/182* (2019.01)
*G06F 21/52* (2013.01)

(52) U.S. Cl.
CPC ........... *G06F 16/182* (2019.01); *G06F 21/52* (2013.01); *G06F 9/445* (2013.01)

(58) Field of Classification Search
CPC .............................. G06F 9/4418; G06F 21/51
See application file for complete search history.

(56) References Cited

U.S. PATENT DOCUMENTS

| | | | | |
|---|---|---|---|---|
| 5,974,547 A * | 10/1999 | Klimenko | ............. | G06F 9/4416 709/217 |
| 2007/0150956 A1* | 6/2007 | Sharma | ................. | G06F 21/554 726/24 |
| 2011/0131339 A1* | 6/2011 | Brown | ................ | G06F 21/6218 709/229 |

* cited by examiner

*Primary Examiner* — Nitin C Patel
*Assistant Examiner* — Eric Chang
(74) *Attorney, Agent, or Firm* — Morris, Manning & Martin, LLP; Adam J. Thompson (57) ABSTRACT

Disclosed are various embodiments securing the execution of unauthorized applications on a computing device. A file system stored in a storage device includes files and file system data structures. The file system data structures have kernel space accessible portions. When a file is executed, a computing device can determine whether the file can be executed based on a file system data structure corresponding to the file based on the kernel space accessible portion. The operating system can determine whether to execute the file or take another action based on flags stored in the kernel space accessible portion.

20 Claims, 8 Drawing Sheets

SYSTEMS AND METHODS FOR SECURELY MANAGING PROGRAM EXECUTION

BACKGROUND

Antivirus software can be used to prevent, detect, and remove malicious software on a computer. With the proliferation of various kinds of malware, antivirus software is limited in its ability to protect from more sophisticated attacks, such as phishing attacks, malicious URLs, and social engineering techniques. Antivirus software is also limited by its ability to recognize malicious software. Another major drawback to antivirus software is that inexperienced users can be made to feel a false sense of security when using the computer.

A unified threat management (UTM) or unified security management (USM) system can perform security functions within a system to prevent rogue user accounts or compromised user accounts from engaging in malicious activity. However similar to antivirus software, UTM or UTS systems can only limit the entrance of malicious software into the system rather than prevent malicious code from running entirely.

SUMMARY

An operating system can limit the execution of files based on configuration information embedded within a file system. The file system can be stored in a storage device and include files and file system data structures. The file system data structures can include a portion that can be accessed from user space via the operating system and a portion that can only be accessed via kernel space. A computing device can boot the operating system.

When programs are to be executed, the operating system can process the execution requests. Each execution request can correspond to a particular file in the file system along with a corresponding data structure. The operating system can load the data structure from the file system and take an action based on parameters stored in the data structures including executing the application or refraining from executing the application. If any file in the file system is modified, the execution configuration information for that modified file is reset to a status of not executing the file automatically.

These and other aspects, objects, features, and embodiments will become apparent to a person of ordinary skill in the art upon consideration of the following detailed description of illustrative embodiments exemplifying the best mode as presently perceived.

BRIEF DESCRIPTION OF THE DRAWINGS

For a more complete understanding of the embodiments and the advantages thereof, reference is now made to the following description, in conjunction with the accompanying figures briefly described as follows.

The drawings illustrate only example embodiments and are therefore not to be considered limiting of the scope described herein, as other equally effective embodiments are within the scope and spirit of this disclosure. The elements and features shown in the drawings are not necessarily drawn to scale, emphasis instead being placed upon clearly illustrating the principles of the embodiments. Additionally, certain dimensions may be exaggerated to help visually convey certain principles. In the drawings, similar reference numerals between figures designate like or corresponding, but not necessarily the same, elements.

DETAILED DESCRIPTION

In the following paragraphs, the embodiments are described in further detail by way of example with reference to the attached drawings. In the description, well known components, methods, and/or processing techniques are omitted or briefly described so as not to obscure the embodiments. As used herein, the "present invention" refers to any one of the embodiments of the invention described herein and any equivalents. Furthermore, reference to various feature(s) of the "present invention" is not to suggest that all embodiments must include the referenced feature(s).

Among embodiments, some aspects of the present invention are implemented by a computer program executed by one or more processors, as described and illustrated. As would be apparent to one having ordinary skill in the art, the present invention may be implemented, at least in part, by computer-readable instructions in various forms, and the present invention is not intended to be limiting to a particular set or sequence of instructions executed by the processor.

The embodiments described herein are not limited in application to the details set forth in the following description or illustrated in the drawings. The invention is capable of other embodiments and of being practiced or carried out in various ways. Also, the phraseology and terminology used herein is for the purpose of description and should not be regarded as limiting. The use of "including," "comprising," or "having" and variations thereof herein is meant to encompass the items listed thereafter, additional items, and equivalents thereof. The terms "connected" and "coupled" are used broadly and encompass both direct and indirect connections and couplings. In addition, the terms "connected" and "coupled" are not limited to electrical, physical, or mechanical connections or couplings. As used herein, the terms "machine," "computer," "server," and "work station" are not limited to a device with a single processor, but may encompass multiple devices (e.g., computers) linked in a system, devices with multiple processors, special purpose devices, devices with various peripherals and input and output devices, software acting as a computer or server, and combinations of the above.

Figure 1:
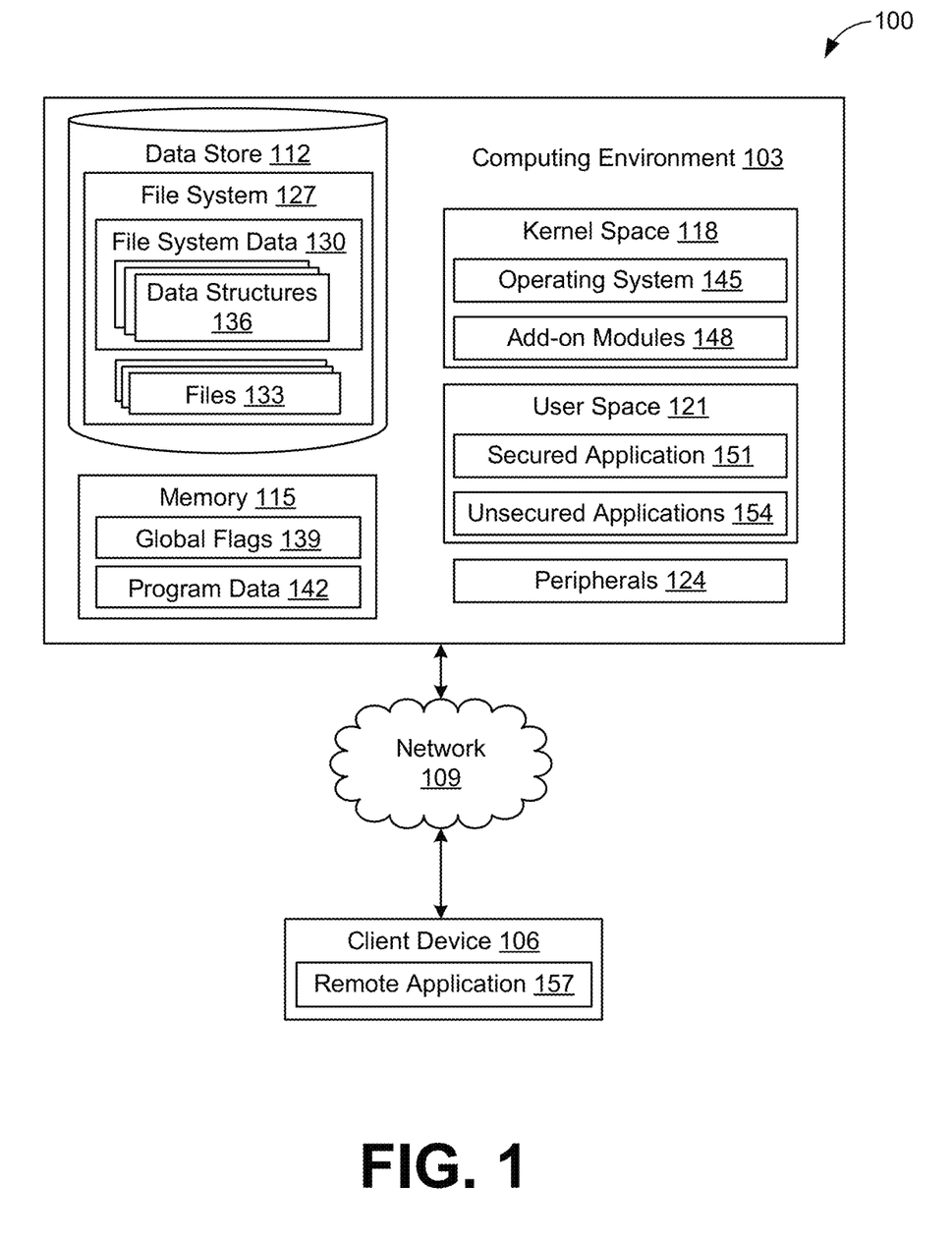
FIG. 1 is a drawing of a networked environment according to various example embodiments.

Turning now to the drawings, exemplary embodiments are described in detail. With reference to FIG. 1, shown is a networked environment 100 according to various embodiments. The networked environment 100 includes a computing environment 103 and one or more client devices 106, which are in data communication with each other via a network 109. The network 109 includes, for example, the Internet, intranets, extranets, wide area networks (WANs), local area networks (LANs), wired networks, wireless networks, or other suitable networks, etc., or any combination of two or more such networks. For example, such networks may comprise satellite networks, cable networks, Ethernet networks, and other types of networks.

The computing environment 103 can include, for example, a server computer or any other system providing computing capability. Alternatively, the computing environment 103 may employ a plurality of computing devices that may be arranged, for example, in one or more server banks or computer banks or other arrangements. Such computing devices may be located in a single installation or may be distributed among many different geographical locations. For example, the computing environment 103 may include a plurality of computing devices that together may comprise a hosted computing resource, a grid computing resource and/or any other distributed computing arrangement. In some cases, the computing environment 103 may correspond to an elastic computing resource where the allotted capacity of processing, network, storage, or other computing-related resources may vary over time.

Various applications and/or other functionality may be executed in the computing environment 103 according to various embodiments. The applications can access a data store 112 and memory 115. Further, the applications can be executed from a kernel space 118 or from a user space 121. The applications can also access peripherals 124.

Various data is stored in a data store 112 can be accessible to the computing environment 103. The data store 112 may be representative of a plurality of data stores 112 as can be appreciated. The data stored in the data store 112, for example, is associated with the operation of the various applications and/or functional entities described below. The data stored in the data store 112 includes, for example, a file system 127 with file system data 130, files 133, and potentially other data.

The components executed on the computing environment 103, for example, include an operating system 145, one or more add-on module 148, secured applications 151, one or more unsecured application 154, and other applications, services, processes, systems, engines, or functionality not discussed in detail herein. Any of the functionality described in the operating system 145 can be implemented as part of one or more add-on modules 148. The operating system 145 is executed to securely manage the execution of files 133 executed in the computing environment 103. The execution of a file 133 can be referred to herein as executing a program.

The operating system 145 can default to not executing any files 133 unless the files 133 are expressly indicated as executable in the data structure 136 corresponding to the file 133. If a file 133 that is authorized to execute is changed in any way, the operation in the file system 127 automatically revokes authorization to execute the file 133. Therefore, when a file 133 receives authorization to execute, that authorization is limited to the file 133 as currently stored in the file system 127. A file 133 can receive authorization or be configured to be executable when one or more bits are set in the data structure 136 that corresponds to the file 133.

The data structure 136 can contain flags to enable execution of a corresponding file 133 based on various factors. As an example, the operating system 145 can decide to not run the requested program, run the requested program only if requested from kernel space, run the requested program only if requested from user space, or run the requested program based on the flags in data structure 136. The operating system 145 can evaluate the flags when deciding whether to execute a file 133 in response to an execution request. In one example embodiment, the data structure 136 is an inode object.

In some embodiments, a file 133 can be configured to allow execution for a period of time or during a time window. For example, the operating system 145 can execute a file 133 only during a three hour time window starting at 1:00 AM on a Sunday based on the flags or data stored in the data structure 136 that corresponds to the file 133. The operating system 145 can continuously check whether a currently executing file 133 is within a valid time window. If outside of the time window, the operating system 145 can terminate a process corresponding to the file 133.

The file 133 can also be configured to execute only while the computing environment 103 or client device 106 is located in a particular geographical area and/or at a particular network location. The file 133 can be configured to execute when the request to execute the file originates from kernel space 118, from a secured application 151, from an unsecured application 154, remotely by a client device 106, or according to other parameters.

The client device 106 is representative of a plurality of client devices that may be coupled to the network 109. The client device 106 can include, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client device 106 may include a display. The display can include, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The client device 106 may be configured to execute various applications such as a remote application 157 and/or other applications. The remote application 157 may be executed in a client device 106, for example, to execute applications on the computing environment 103 and access network content served up by the computing environment 103 and/or other servers. The remote application 157 can render a user interface on the display of the client device 106. To this end, the remote application 157 can include, for example, a browser, a dedicated application, etc., and the user interface can be a network page, an application screen, etc. The client device 106 may be configured to execute applications beyond the remote application 157 such as, for example, email applications, social networking applications, word processors, spreadsheets, and/or other applications.

The file system data 130 can include data structures 136. Each of the data structures 136 can relate to a different file 133, such as in a one-to-one mapping or a many-to-one mapping. As an example, a many-to-one mapping can occur when a hard link is created to a file 133 because a second data structure 136 can map to a single file 133. A data structure 136 can include metadata describing a corresponding file 133. The data structure 136 can be stored on a storage device, either directly or indirectly. As an example, the data structures 136 can be stored directly on a hard drive or in memory 115, or indirectly in a file that is itself stored on a storage device or in memory 115. The data structure 136 can include additional metadata when loaded into memory by the operating system 145, where the additional metadata is not stored on the storage device. Rather, the additional metadata is generated in real-time by the operating system 145, and is for use by the operating system 145. The data structures 136 can be stored in a separate section of a storage device than the files 133.

The metadata in the data structure 136 can be stored in a variety of fields. The fields can be shared among all data structures 136. The fields can include size of the file 133, a list of blocks storing the file 133, whether the data structure 136 is used for a file 133, and other information. Some of the fields may correspond to fixed size of data with individual bits of the fixed size corresponding to different variables or features. As an example, a 32-bit segment of data can include up to 32 different bits mapped to different features. However, some of the bits can be left unused or reserved for future use.

Some bits within the fields or bits can be automatically set to a default value with each edit or change to the file 133. As an example, with each write of a file 133, a corresponding data structure 136 can be rewritten again in a new data structure 136 spot. The data in the data structure 136 can be generated again. Because the location on a hard disc of the file 133 changes, the list of blocks storing the file 133 and size of the file 133 need to be determined. Accordingly, when writing a replacement or new data structure 136 for a changed or new file 133, unused fields will automatically be set to their default values. Any changes of fields that were not generated with the file 133 stored in the data structure 136 cannot be propagated to the replacement data structure 136.

In some embodiments, one or more unused bits from a field can be used to store security data or other data about a file 133. A mapping can be determined for unused bits from multiple fields. The mapped unused bits can be combined to create custom fields, such as, for example, an execution configuration field. The execution configuration field can include flags to enable or disable execution of a file 133, among other functions that are discussed herein. In the case of execution configuration fields stored in a data structure 136, the operating system 145 and file system 127 can automatically set the execution configuration fields or flags within the execution configuration fields for a modified file 133 to a default action of never executing the modified program whenever a change occurs to the modified file 133.

The memory 115 can include global flags 139, program data 142, and potentially other data. The global flags 139 can include a portion accessible only by programs executed from kernel space 118, such as the operating system 145, add-on modules 148, or other processes, threads, or applications executed in kernel space 118. As an example, the global flags 139 can include kernel-only accessible flags that specify which features of the operating system 145 are available throughout a boot up process and afterwards during normal operation. During boot up, the operating system 145 can start various services and establish various capabilities, such as, for example, startup and configure various peripherals 124 including a network adapter, USB ports, and other devices; start up a web server, a file server, one or more kernel space level processes, one or more unsecured applications 154 or a secured applications 151; and other functionality.

The global flags 139 can be used to determine whether one or more of the various services or capabilities are available. The operating system 145 can determine a list of services and capabilities required in order to execute a program stored in a file 133. To accomplish this, the operating system 145 can query the global flags 139 to determine a current stage in the boot of the operating system 145. The operating system 145 can determine whether each of the services and capabilities in the list are available prior to executing the file 133. If available, the operating system 145 can determine whether to execute the file 133. The determination of whether to execute the file 133 can be based on flags in the data structure 136 corresponding to the file 133. Otherwise, the operating system 145 can prevent the file 133 from being executed because one or more required service or capability is unavailable. The operating system 145 can check before executing files 133 to see if they are missing dependencies because the execution configuration fields need to be changed to enable execution of every service or process. As such, the likelihood of a service or capability being unavailable is greater than a generic operating system.

The operating system 145 can determine whether a request to execute a program originates from user space 121 or kernel space 118 based on the global flags 139. The operating system 145 can also determine whether the request corresponds to a secured application 151 or an unsecured application 154. The global flags 139 can include data describing a list of peripherals 124 available. The list of peripherals 124 can include address information for the peripherals 124, such as a hardware address. As an example, a major and minor number for each peripheral 124 can be included in global flags 139.

The operating system 145 can determine that a hardware address associated with the execution request matches the predetermined hardware address corresponding to the secured application 151. The operating system 145 can base what action to take when an execution request is received on whether the hardware address matches the predetermined hardware address corresponding to the secured application 151. In one embodiment, the predetermined hardware address corresponds to console of the computing environment 103, a particular network port of the computing environment 103, or another hardware address. A peripheral 124 with a predefined major and minor number can correspond to the secured application 151. A predefined major and minor number pair may be the hardware address of the secured application 151. For example, when a request to execute a file 133 or a request to modify a configuration originates from the secured application 151, the global flags 139 includes the predefined major and minor number.

The operating system 145 can determine that the predefined major and minor number for the secured application 151 exists in the global flags 139. The operating system 145 can determine that a device is physically connected to the computing environment 103 via a non-network connection based on the global flags 139 containing the predefined major and minor number for the secured application 151.

The operating system 145 can receive an execution request from a variety of different sources. A user of the computing device or another program can request a file 133 be executed from user space 121. For example, the user can attempt to execute a program by utilizing a desktop environment or user interface, such as the GNU Network Object Model Environment (GNOME), Kool Desktop Environment (KDE), Windows, and other operating system and application user interfaces. These user interfaces are generated by unsecure applications 154 because a user can attempt to execute any file accessible by the user interface.

A secured application 151 can be used to initiate an execution request for a file 133. The secured application 151 can be a trusted application that requires additional security before allowing an execution request. The additional security can include using a peripheral 124 with a predefined hardware address. Requiring the existence of the peripheral 124 adds an additional layer of security to the secured application 151. The secured application 151 can also facilitate configuration of the data structures 136 from user space. The secured application 151 can send commands to change the execution configuration field for one or more data structures 136 as discussed in FIG. 6.

The execution request can also originate from kernel space 118. To perform a task, the operating system 145 can rely on numerous kernel space 118 processes and threads. As such, the operating system 145 can attempt to execute a file 133 from kernel space 118. In some embodiments, users can only request that files 133 be executed from user space 121 and not from kernel space 118. Accordingly, when a file 133 is executed from kernel space 118, less security may be used. An operating system may take different actions when receiving two different execution requests for a file 133, one from kernel space 118 and one from user space 121, based on the enhanced security of executing from kernel space 118. For example, the operating system 145 can take an action of not executing a file 133 when an execution request originates from user space 121, but take an action of executing the same file 133 when another execution request originates from kernel space 118.

In some embodiments, a secured application flag in the execution configuration field from a data structure 136 corresponds to whether a file 133 can be executed from the secured application 151. For example, if the secured application flag is set to true, the secured application 151 can execute the corresponding file 133. In this example, if other flags enabling unsecured applications 154 from executing the corresponding file 133, the unsecured application 154 cannot execute the corresponding file 133.

According to some embodiments, when an execution request initiates from user space 121, a data structure is located in memory 115 as program data 142. The operating system 145 can determine whether the execution request originated from user space 121 by testing to see if the data structure located in program data 142 is populated. Similarly, the operating system 145 can determine that the execution request originated from kernel space 118 based on the data structure being populated in program data 142.

The operating system 145 can receive execution requests for files 133 from the remote application 157. As an example, the remote application 157 can initiate a remote connection to the computing environment 103, such as, for example, via an unsecured application 154. In one example, an unsecured application 154 is a secure shell (SSH) daemon, and the remote application 157 initiates an SSH session with the unsecured application 154 via the network 109. In this example, the remote application 157 can submit an execution request for a file 133 via the SSH session.

In one example, the remote application 157 submits an execution request by attempting to remotely mounting a drive from the computing environment 103. In some embodiments, the remote application 157 can attempt to remotely mount the file system 127 using Network File System (NFS) protocols, a Secure Message Block (SMB) protocol like Common Internet File System (CIFS), or other mounting method. The operating system 145 can receive an execution request associated with a file 133 corresponding to the attempted mount. For example, an operating system 145 can receive an execution request for a file 133 corresponding to the command mount.

In some embodiments, the operating system 145 can prevent the mounting of the file system 127 to prevent external modification of the data structures 136, for example, based on an execution configuration field corresponding to a file 133 for a mount command. The execution configuration field corresponding to the file 133 for the mount command can also specify whether the operating system 145 should allow files 133 to be mounted by a remote application 157. For example, the operating system 145 can allow a remote application 157 to mount a file 133 while preventing the remote application 157 from mounting the file system 127 based on an execution configuration field. In some embodiments, the operating system 145 can allow the file system 127 to be remotely mounted by a client application 157, but prevent edits to the execution configuration field corresponding to modified files. In this embodiment, when a file 133 is modified remotely by the remote application 157, the execution configuration field is automatically reset to prevent executing the modified file 133.

The operating system 145 can identify that the execution request for a file 133 originated from the remote application 157. In some embodiments, the operating system 145 can determine that the remote application 157 initiated the execution request based on a hardware address, such as a major and minor number, corresponding to a peripheral 124 that submitted the execution request. The operating system can determine an action to take when the execution request originates from a remote application 157 based on flags in an execution configuration field from the data structure 136 that corresponds to the file 133. In one example, based on the execution configuration field, the operating system 145 can execute a file 133 in response to an execution request originating from an unsecured application 154, but prevent the execution of the same file 133 in response to the execution request originating from the remote application 157.

Figure 2:
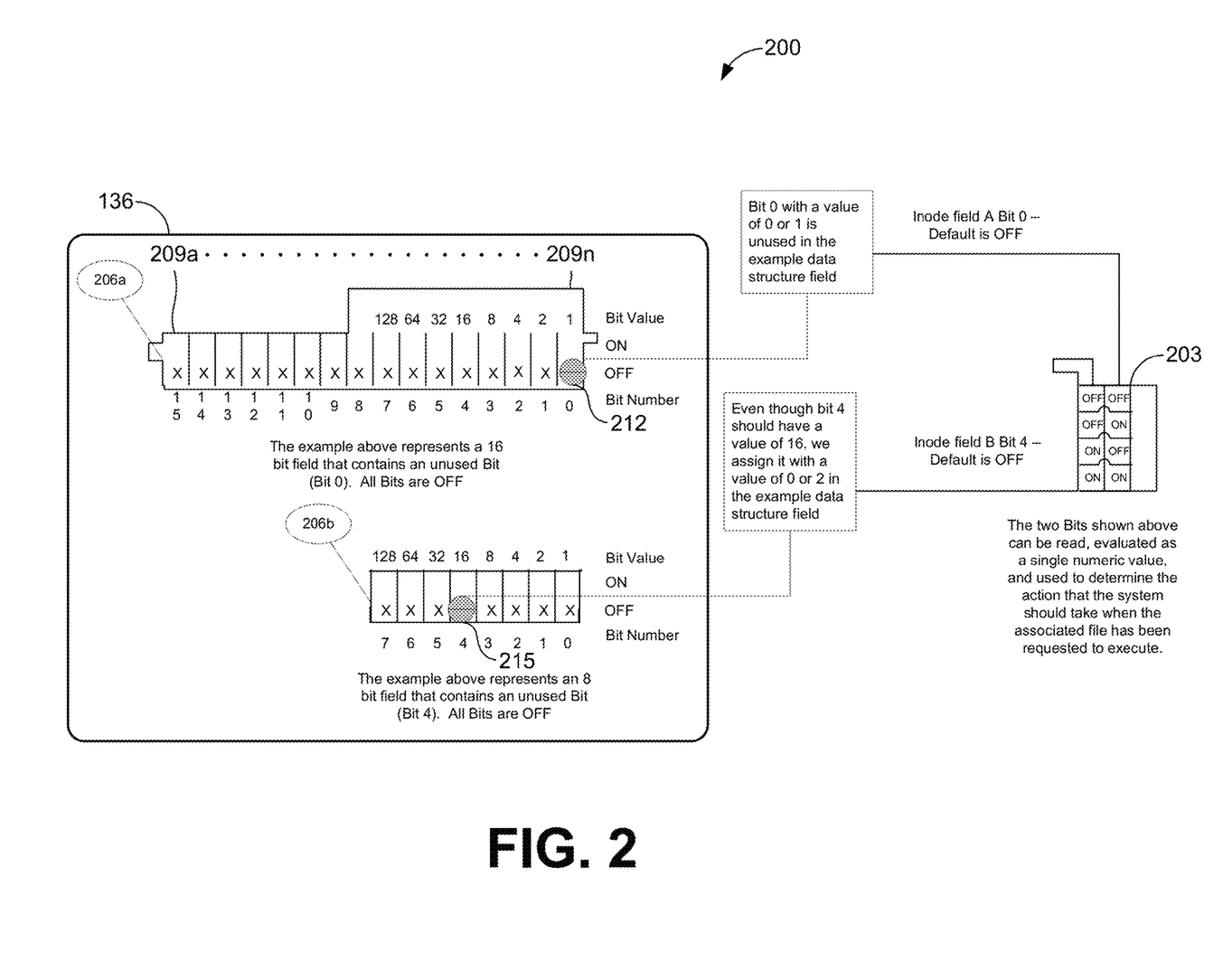
FIG. 2 illustrates a memory based configuration format to manage execution of programs on the computing environment in the networked environment of FIG. 1 according to various example embodiments.

With respect to FIG. 2, shown is a memory based configuration format 200 to manage execution of files 133 on the computing environment 103 in the networked environment 100 of FIG. 1 according to various example embodiments. The memory based configuration format 200 includes an execution configuration field 203 with one or more bits of data. The data structure 136 can include one or more fields 206a and 206b. The field 206a is shown with bits 209a-n. The bits 209a-n can be assigned values corresponding to binary digits. For example, bit 209n can correspond to bit number 0 with bit value of 1, bit 209n-1 can correspond to bit number 1 with bit value of 2, and 209n-2 can correspond to bit number 3 with bit value of 4. These bit values can be used as a bit mask to determine whether each bit 209a-n is on or off.

One of more of the bits 209a-n may be unused or reserved for future use in a field 206a or 206b of a data structure 136. When a change occurs to a file 133, the corresponding data structure 136 is rewritten in a new data structure location. Any data in unused bits 209 is lost and reset to its default value. The execution configuration field 203 can be generated by accumulating unused bits 209a-n from various fields, such as, for example, an unused bits 212 and 215. In some embodiments, the unused bits 212 and 215 default to 0 and are reset to 0 automatically with every change of a corresponding file 133. In some embodiments, some of the unused bits may default to 1. The execution configuration field 203 cannot be accessed, changed, or modified from user space 121. Rather, the execution configuration field 203 can only be accessed, changed, or modified from kernel space 118. Although two bits are shown, the execution configuration field 203 can include more or less bits to store information about the execution configuration of a file 133.

The two bits 212 and 215 from the execution configuration field 203 can form a binary number between 0 and 3, although the range of values can vary based on a number of bits in each variable of the execution configuration field 203. According to one example, a value of 0 indicates that a file 133 cannot be executed, a value of 1 indicates that the file 133 can only be executed from kernel space 118, a value of 2 indicates that the file 133 can only be executed from user space 121, and a value of 3 indicates that the file 133 can be executed from either kernel space 118 or user space 121. Other bits can be used to determine whether a particular application can execute the file 133, such as, for example, the secure application 151.

Figure 3:
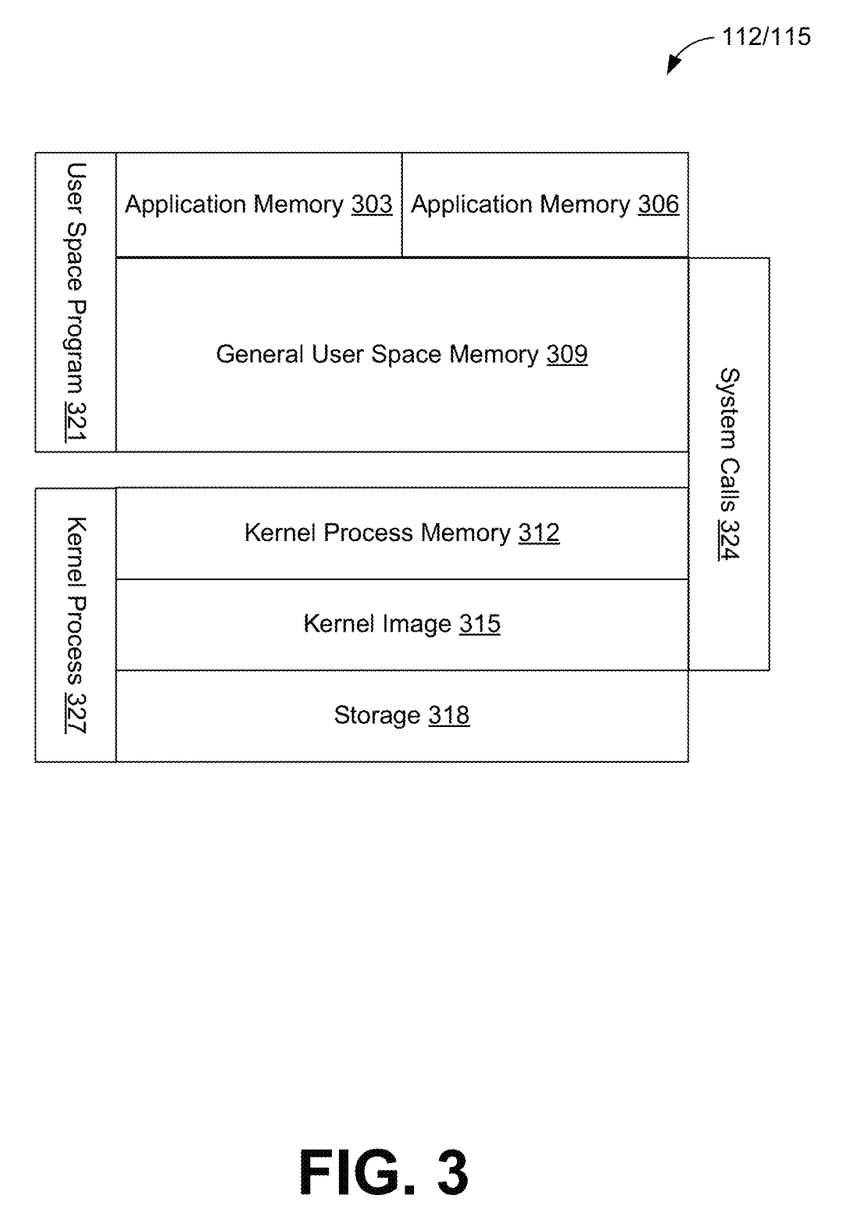
FIG. 3 illustrates an example memory access rights for processes within the computing environment in the networked environment of FIG. 1 according to various example embodiments.

Turning to FIG. 3, shown is memory access rights for processes within the computing environment 103 in the networked environment 100 of FIG. 1 according to various example embodiments. The data store 112 and the memory 115 can include an application memory 303, an application memory 306, a general user space memory 309, a kernel process memory 312, a kernel image 315, a storage 318, and other storage items. The application memory 303 can correspond to a first process executing an unsecured application 154 or a secured application 151, and the application memory 306 can correspond to second process executing an unsecured application 154 or a secured application 151.

The first and second processes are user space programs 321 executed in user space. Each of the user space programs 321 can access the general user space memory 309 and can make system calls 324. However, the user space programs 321 cannot access any kernel space 118 memory, such as, for example, kernel process memory 312, a kernel image 315, or a storage 318. The system calls 324 can access the general user space memory 309, but invoke kernel level functions that have access to the kernel process memory 312 and the kernel image 315. Although not shown, the kernel process 327 can access application memory 303, application memory 306, and general user space memory 309.

The kernel image 315 can be a chunk of memory allocated to load the initial image of the operating system 145 including memory necessary to boot up and run the image. The kernel process memory 312 can be allocated and used to run the one or more kernel processes 327. The storage 318 can include the data store 112. In some embodiments, the storage 318 can also store virtual pages of memory.

The system calls 324 are a method by which the applications in user space 121 can request action by the operating system 145. The operating system 145 can spawn a kernel process 327 to carry out the requested action, but the application in user space 121 lacks visibility to the kernel space 118 activity. As an example, if an application in user space 121 needs information from a file 133, the application makes a call to the system calls 324 of "open" and "read." A kernel process 327 accesses the storage 318 to retrieve data from the file 133 and returns the data to the application running in user space 121. When the operating system 145 receives a request to execute a file 133, the file 133 and data structure 136 can only be accessed directly by applications executed in kernel space 118, such as the operating system. Accordingly, an application executed in user space 121 cannot access storage 318 directly including files 133 and data structures 136.

Certain data in the storage 318 can be accessed by applications executed in user space 121 via the operating system 145, such as, for example, using an open or read call. However, other portions of the storage 318 cannot be accessed from user space 121, and are thus kernel space accessible only. The execution configuration field 203 cannot be accessed directly from user space 121 even through the use of system calls. Although the secured application 151 can update and read data corresponding to the execution configuration field 203 with a secured hardware peripheral as discussed in FIG. 6, the execution configuration field 203 is not directly accessible from user space 121. Rather, the operating system 145 can receive system calls from the secured application 151, and update the execution configuration field 203 on behalf of the secured application 151. The operating system 145 can validate the secured application 151 prior to updating the execution configuration field 203.

Before turning to the process flow diagrams of FIGS. 4-7, it is noted that embodiments described herein may be practiced using an alternative order of the steps illustrated in FIGS. 4-7. That is, the process flows illustrated in FIGS. 4-7 are provided as examples only, and the embodiments may be practiced using process flows that differ from those illustrated. Additionally, it is noted that not all steps are required in every embodiment. In other words, one or more of the steps may be omitted or replaced, without departing from the spirit and scope of the embodiments.

Further, steps may be performed in different orders, in parallel with one another, or omitted entirely, and/or certain additional steps may be performed without departing from the scope and spirit of the embodiments. Although some functionality is described as being implemented in the operating system 145, any functionality implemented in operating system 145 can be implemented in one or more add-on modules 148. In some embodiments, add-on modules 148 are omitted entirely, and all functionality is implemented in the operating system 145.

Figure 4:
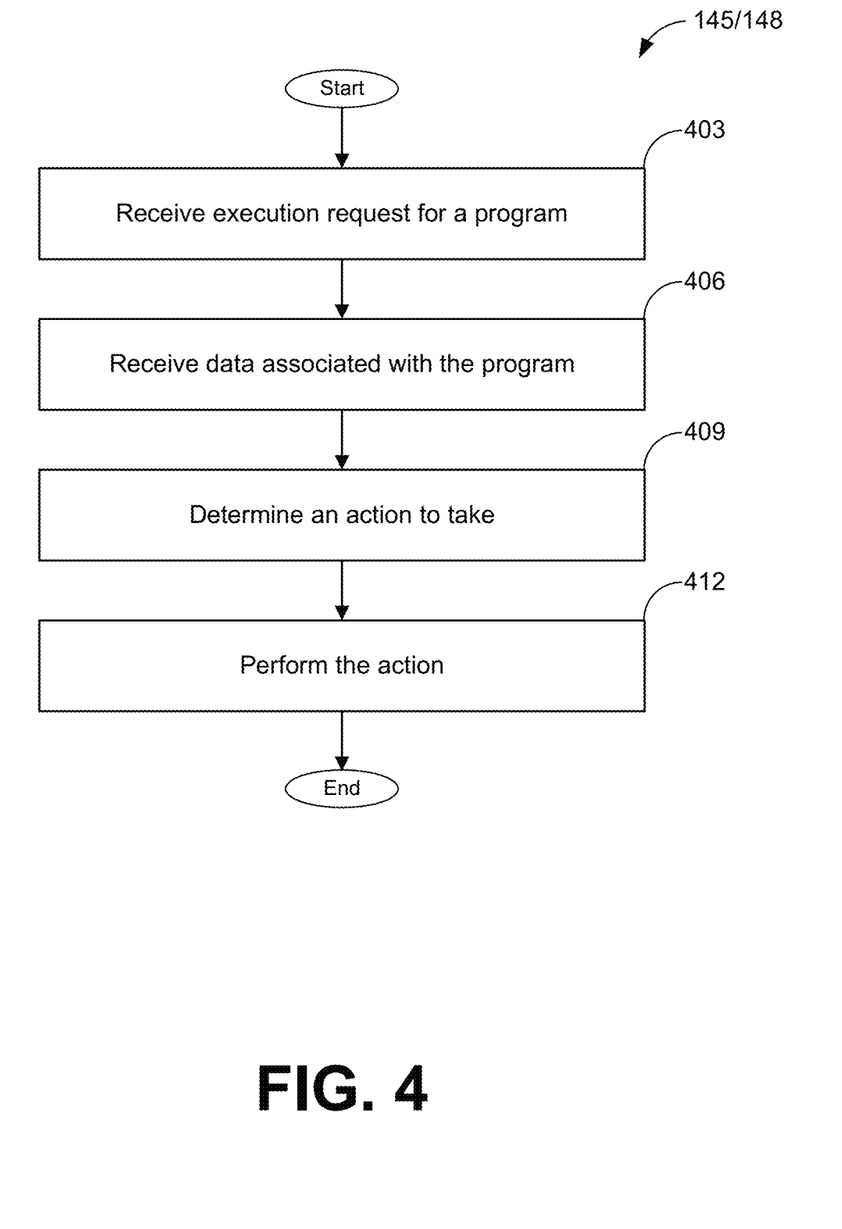
FIG. 4 illustrates an example flowchart of certain functionality implemented by portions the operating system and/or the add-on modules executed in a computing environment in the networked environment of FIG. 1 according to various embodiments of the present disclosure.

With reference to FIG. 4, shown is a flowchart of certain functionality for processing an execution request implemented by portions the operating system 145 and/or one or more add-on modules 148 executed in a computing environment 103 in the networked environment 100 of FIG. 1 according to various embodiments of the present disclosure.

At box 403, the operating system 145 can receive an execution request for a program. For example, the operating system 145 can receive a system call from an application executed in user space 121 to execute a file 133. The system call can originate from the secured application 151 or an unsecured application 154. As another example, a process in kernel space 118, such as, for example, kernel processes 327 (FIG. 3) can attempt to execute a file 133 by making an execution request.

At box 406, the operating system 145 can receive data associated with the program. The operating system 145 can load the data structure 136 that correspond to a file 133 requested in an execution request. The data structure 136 can be loaded from the data store 112. The operating system 145 can generate the execution configuration field 203 including one or more variables from the data structure 136. The operating system 145 can also load data from memory 115, such as, for example, the global flags 139 and program data 142. The operating system 145 can determine a hardware address for each peripheral 124.

At box 409, the operating system 145 can determine an action to take. For example, the operating system 145 can determine whether the execution request originated from kernel space 118 or user space 121. If from user space 121, the operating system 145 can determine whether the execution request originated from a secured application 151 or an unsecured application 154. For example, the operating system 145 can identify from the global flags 139 whether a predefined hardware address exists to determine whether the secured application 151 initiated the execution request.

In some embodiments, the operating system 145 can utilize multi-level authentication before executing a file 133. As an example, the operating system 145 can determine whether the file 133 can be executed based on the origin of the request and determine whether executing the file 133 complies with various other configuration requirements. The other configuration requirements can include determining whether the computing environment 103 or client device 106 is located in a geographical area, such as, for example, by using a geofence.

The other configuration requirements can also include a configuration mode of the operating system 145 being disabled, being that the execution request originated within a time window, and the file 133 having not been executed for more than a predefined amount of time during a time window, or other requirement. The location can be determined by a GPS location circuit or other location device in the computing environment 103. The other configuration requirements can be stored in variables of the execution configuration field 203. According to one example, an execution configuration field 203 for a file 133 can specify that the file 133 can be executed from either kernel space 118 or the secured application 151, but can only be executed during the hours of 8 AM-5 PM on Monday through Friday in the state of Georgia.

Based on the data from box 406, the operating system 145 can perform the action of executing the file 133 and/or take a remedial action. The remedial action can include preventing the file 133 from executing, quarantining the file 133, deleting the file 133, logging the execution attempt in a log file, notifying an administrative user, or performing another remedial action. The operating system 145 can send an email, SMS, or other message to a user to alert of the execution request as a remedial action. The remedial actions can also occur as a preventative or informative action. For example, the execution attempt can be logged even when the file 133 is executed successfully for informative purposes.

At box 412, the operating system 145 can perform the action. For example, the operating system 145 can cause the file 133 to be executed. As another example, the operating system 145 can return a failure code to the application requesting for execution. In some embodiments, the operating system 145 returns success to the requesting application even if the action is to not execute the file 133.

Figure 5:
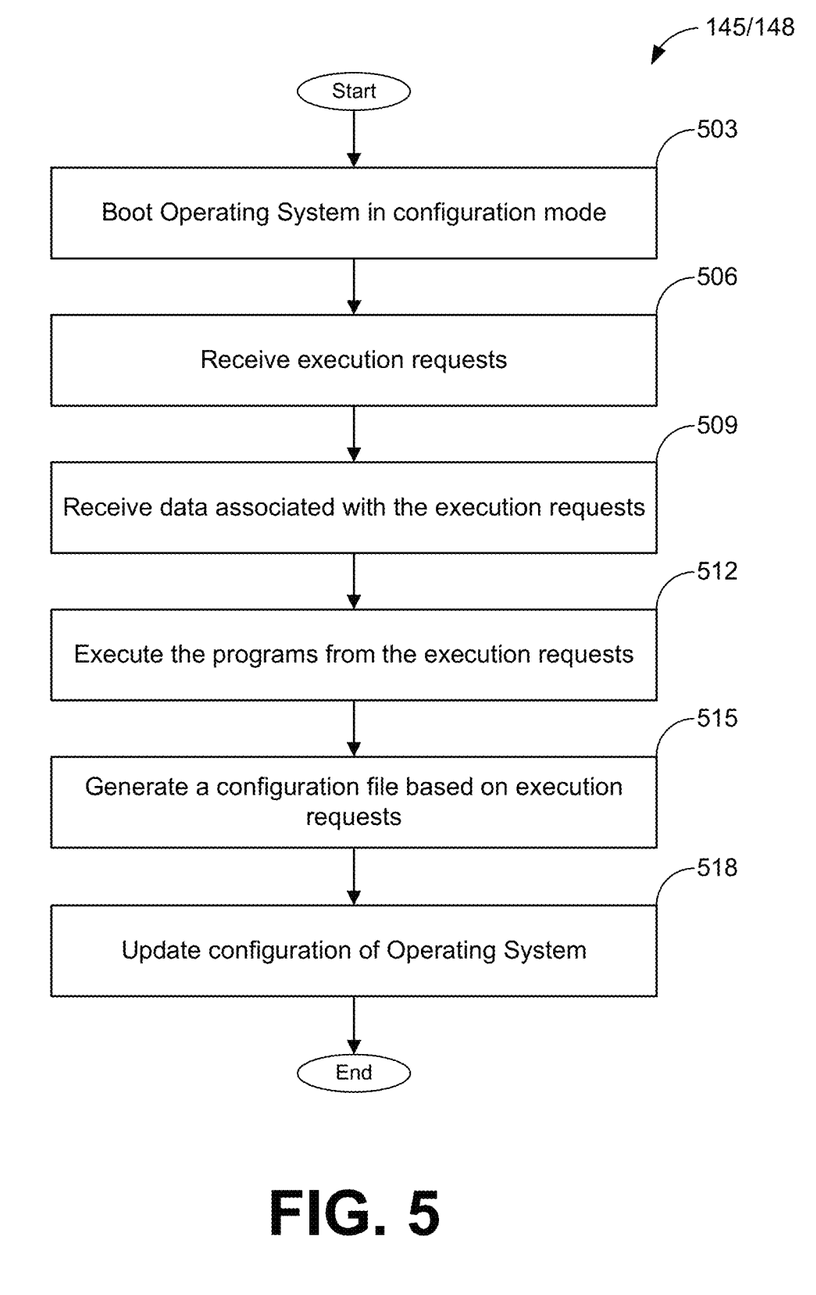
FIG. 5 illustrates an example flowchart of certain functionality implemented by portions the operating system and/or the add-on modules executed in a computing environment in the networked environment of FIG. 1 according to various embodiments of the present disclosure.

Turning to FIG. 5, shown is a flowchart of certain functionality for configuring the computing environment 103 implemented by portions the operating system 145 and/or one or more add-on modules 148 executed in a computing environment 103 in the networked environment 100 of FIG. 1 according to various embodiments of the present disclosure.

At box 503, a configuration mode can be enabled on the operation system 145. For example, the file system 127 or bios can include a configuration flag, that when triggered, boots the operating system 145 in a configuration mode. In some embodiments, the configuration mode is triggered when a specific peripheral 124 is connected to the computing environment 103. For example, a USB device can be inserted with a cryptographic key that, when verified during the boot process, enables a configuration mode of the operating system 145.

In one embodiment, a flag is stored in a portion of a storage 318 that enables the configuration mode of the operating system 145. In another embodiment, the computing environment is a trusted platform module (TPM) with an integrated cryptographic key that requires a paired key in order to change the mode of the operating system 145 into configuration mode.

At box 506, the operating system 145 can receive an execution request as described in box 403. At box 509, the operating system 145 can receive data associated with the program as described in box 406.

At box 512, the operating system 145 can execute the programs requested in the execution request. Unlike in the normal mode of operation, the operating system 145 always executes the files 133 requested in an execution request. The operating system 145 can track every file 133 executed during standard operation of the computing environment 103. The operating system 145 can also track parameters associated with the execution of each file 133. As an example, the operating system 145 can track whether the file 133 was executed from kernel space 118 or user space 121, whether the file 133 was executed from a secured application 151, the time periods when the file 133 is executed, geographic locations when the file 133 is executed, and other information. In some embodiments, the operating system 145 can track other diagnostic information, such as, for example, CPU and memory usage of the process corresponding to the executed file 133, systems calls made by the process, file system accesses made by the process, and other diagnostic information.

At box 515, the operating system 145 generates a configuration file based on the execution requests. The operating system 145 can generate a log file detailing all files 133 executed during the configuration mode. The log file can include parameters associated with the execution of each file 133 and other diagnostic information as generated in box 512.

At box 518, a configuration of the operating system 145 can be updated. After updating the configuration or as part of updating the configuration, the configuration mode of the operating system 145 can be disabled. The configuration can be published or deployed to the computing environment 103. For example, an external server or the client device 106 can generate an update to the execution configuration field 203 in the data structures 136 for each file 133 and write the updated data structures 136 to the data store 112. The update can be saved to the data store 112 by mounting a storage 318 to the external server or the client device 106 and writing directly to the file system 127 on the storage 318.

The update can also be saved to the data store 112 via the secured application 151. According to one example, the remote application 157 sends an updated configuration to the secured application 151. The secured application 151 performs configuration system calls to the operating system 145 to update the data structures 136, as discussed in FIG. 6.

The updating of the operating system 145 can also occur during the configuration mode of the operating system 145. As an example, the operating system 145 can adjust the execution configuration field 203 for each of the executed files 133. The operating system 145, the remote application 157, or an external server can adjust the execution configuration field 203 with a minimum level of execution parameters as would have been necessary in configuration mode. As an example, the operating system 145 can adjust the data structure 136 to enable kernel only execution for a file 133 that is executed from kernel space 118 during configuration mode. As another example, the operating system 145 can adjust the data structure 136 to enable execution for 15 minutes starting at 1:00 PM from user space 121 only for a file 133 that is executed from a crontab associated with a user account at 1:00 PM.

By enabling configuration mode and updating the configuration of the computing environment 103 as discussed in FIG. 5, a software developer can generate a desirable production computing environment 103 and quickly configure the computing environment 103 to limit the execution of files 133 to those enabled for execution when deployed in production. Any changes to a file 133 will automatically prevent the file 133 from being executed, and thus, no new malicious software can be introduced to the system. Introducing malicious software to the file system 127 will result in code that cannot be executed.

Figure 6:
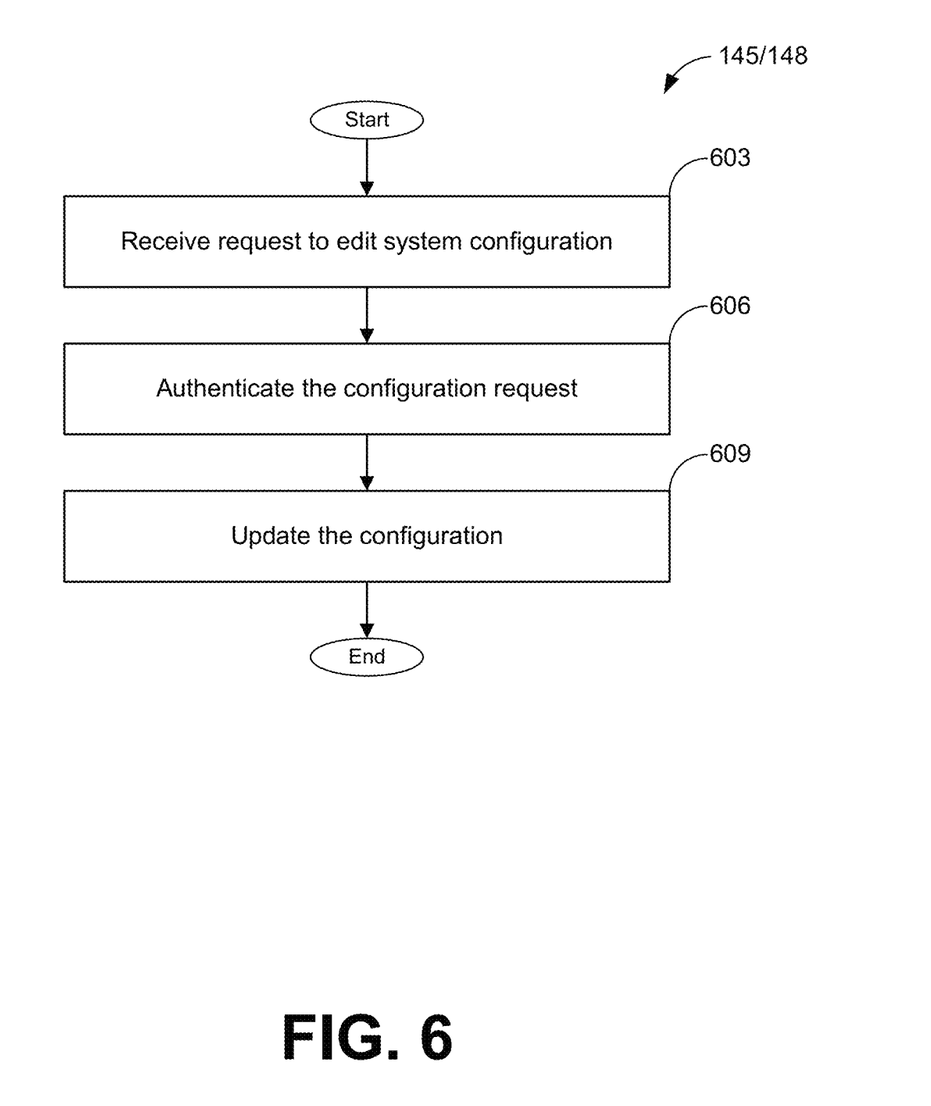
FIG. 6 illustrates an example flowchart of certain functionality implemented by portions the operating system and/or the add-on modules executed in a computing environment in the networked environment of FIG. 1 according to various embodiments of the present disclosure.

Turning to FIG. 6, shown is a flowchart of certain functionality implemented for adjusting configurations from a secured application 151 by portions the operating system 145 and/or one or more add-on modules 148 executed in a computing environment 103 in the networked environment 100 of FIG. 1 according to various embodiments of the present disclosure.

At box 603, the operating system 145 receives a request to edit system configuration. The secured application 151 can perform one or more system calls to update the system configuration. The operating system 145 can receive the system calls from the secured application 151.

In box 606, the operating system 145 can authenticate the configuration request. The operating system 145 can validate that a peripheral 124 is connected to the computing environment before updating the configuration based on the system calls from the secured application 151, such as, for example, by verifying a hardware address of the peripheral 124 or validating a security key associated with the peripheral. The operating system 145 can validate that a major and minor number of the hardware address associated with the peripheral 124 matches a predefined major minor number.

In box 609, the operating system 145 can update the configuration. If the configuration request is authenticated in box 606, the operating system 145 can perform the requested changes to the configuration. Otherwise, the operating system 145 can ignore the request or take remedial action as discussed herein. The operating system 145 can adjust information in the data structures 136 based on data included in the configuration request. Various variables in the execution configuration field 203 can be updated for one or more files 133 based on the configuration request. As an example, the secured application 151 can make a system call to change a file 133 from being unable to be executed to be able to be executed in user space 121 only. Further, the secured application 151 can make a system call to geofence the execution of a file 133 to a specified area.

Figure 7:
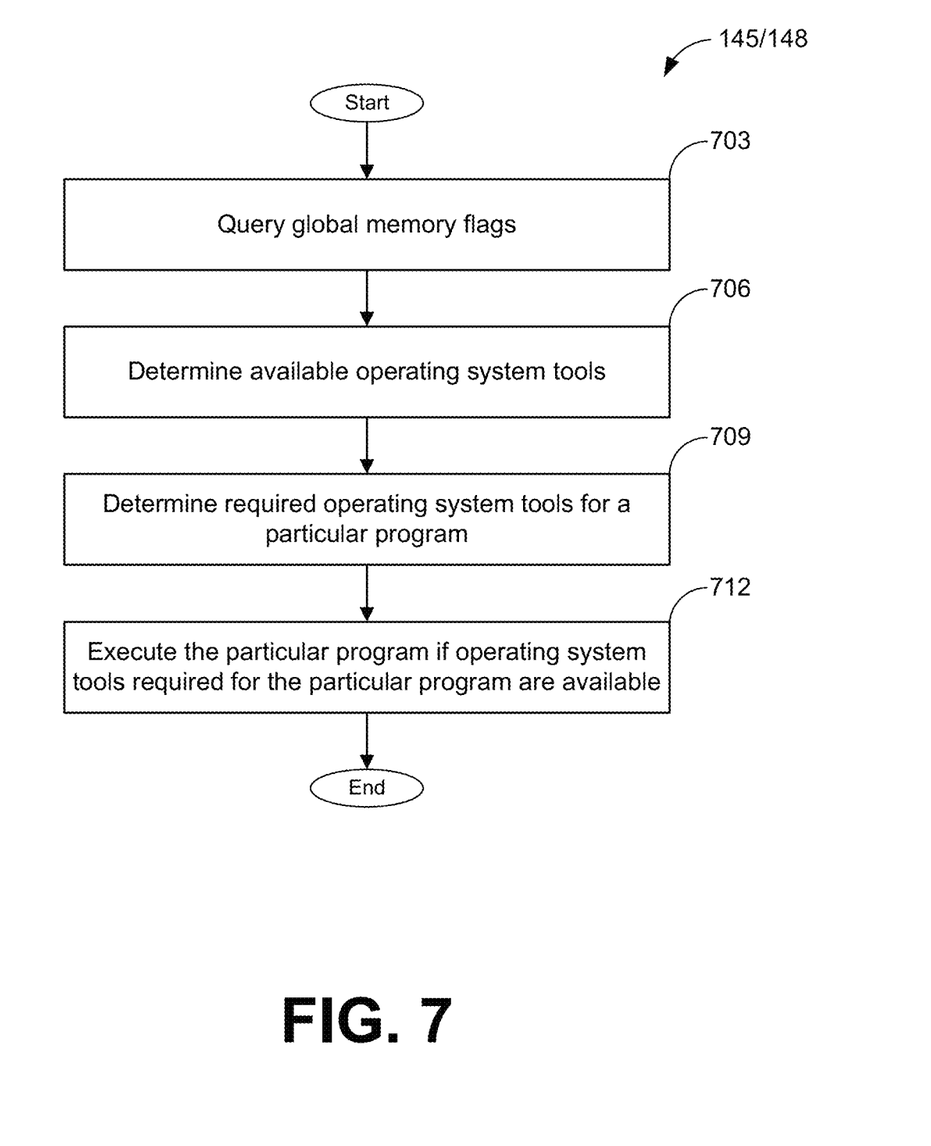
FIG. 7 illustrates an example flowchart of certain functionality implemented by portions the operating system and/or the add-on modules executed in a computing environment in the networked environment of FIG. 1 according to various embodiments of the present disclosure.

Turning to FIG. 7, shown is a flowchart of certain functionality implemented for ensuring operating system tools are available to execute programs by portions the operating system and/or the add-on modules executed in a computing environment in the networked environment of FIG. 1 according to various embodiments of the present disclosure.

At box 703, the operating system 145 can query global flags 139 in memory 115. The global flags 139 can be queried by accessing a structure storing the global flags 139 or by accessing a memory address corresponding to the global flags 139. In some embodiments, the global flags 139 are accessed directly as stored in memory 115. In other embodiments, the global flags 139 are copied to another intermediate memory location.

At box 706, the operating system can determine available operating system tools. The global flags 139 can be used to determine whether one or more services or capabilities are available. To accomplish this, the operating system 145 can query the global flags 139 to determine a current stage in the boot of the operating system 145.

At box 709, the operating system can determine required operating system tools to execute a particular file 133. The operating system 145 can determine a list of services and capabilities required in order to execute a program stored in a file 133.

At box 712, the operating system 145 can determine whether to execute the file 133 based on whether required operating system tools from box 709 are available. The operating system 145 can determine whether each of the services and capabilities in the list from box 709 are available prior to executing the file 133. The list from box 709 can be compared to the list of available operating system tools from box 706. If available, the operating system 145 can determine whether to execute the file 133 using the process discussed in FIG. 4. The determination of whether to execute the file 133 can be based on flags in the data structure 136 corresponding to the file 133. Otherwise, the operating system 145 can prevent the file 133 from being executed because one or more required service or capability is unavailable.

Figure 8:
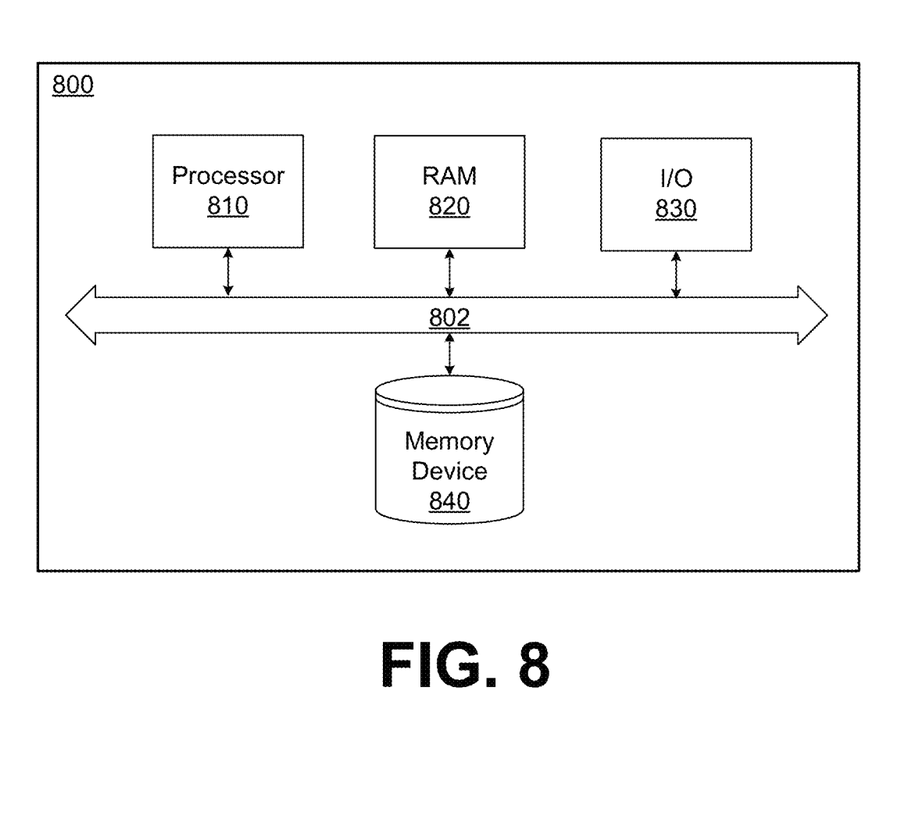
FIG. 8 is a schematic block diagram that illustrates an example computing environment employed in the networked environment of FIG. 1 according to various embodiments.

Turning to FIG. 8, an example hardware diagram of a general purpose computer 800 is illustrated. Any of the computing environment 103 and the client devices 106 may be implemented, in part, using one or more elements of the general purpose computer 800. The computer 800 includes a processor 810, a Random Access Memory ("RAM") 820, a Read Only Memory ("ROM") 830, a memory device 840, a network interface 850, and an Input Output ("I/O") interface 860. The elements of the computer 800 are communicatively coupled via a bus 802.

The processor 810 comprises any well known general purpose arithmetic processor or Application Specific Integrated Circuit ("ASIC"). The RAM 820 and ROM 830 comprise any well-known random access or read only memory device that stores computer-readable instructions to be executed by the processor 810. The memory device 830 stores computer-readable instructions thereon that, when executed by the processor 810, direct the processor 810 to execute various aspects of the present invention described herein. When the processor 810 comprises an ASIC, the processes described herein may be executed by the ASIC according to an embedded circuitry design of the ASIC, by firmware of the ASIC, or both an embedded circuitry design and firmware of the ASIC. As a non-limiting example group, the memory device 830 comprises one or more of an optical disc, a magnetic disc, a semiconductor memory (i.e., a semiconductor, floating gate, or similar flash based memory), a magnetic tape memory, a removable memory, combinations thereof, or any other known memory means for storing computer-readable instructions. The network interface 850 comprises hardware interfaces to communicate over data networks. The I/O interface 860 comprises device input and output interfaces such as keyboard, pointing device, display, communication, and other interfaces. The bus 802 electrically and communicatively couples the processor 810, the RAM 820, the ROM 830, the memory device 840, the network interface 850, and the I/O interface 860, so that data and instructions may be communicated among them.

In operation, the processor 810 is configured to retrieve computer-readable instructions stored on the memory device 840, the RAM 820, the ROM 830, or another storage means, and copy the computer-readable instructions to the RAM 820 or the ROM 830 for execution, for example. The processor 810 is further configured to execute the computer-readable instructions to implement various aspects and features of the present invention. For example, the processor 810 may be adapted and configured to execute the processes described above with reference to FIGS. 4-7, including the processes described as being performed by the operating system 145, the add-on modules 148, the secured application 151, the unsecured applications 154, and the remote application 157. Also, the memory device 840 may store the data stored in the data store 112.

A phrase, such as "at least one of X, Y, or Z," unless specifically stated otherwise, is to be understood with the context as used in general to present that an item, term, etc., can be either X, Y, or Z, or any combination thereof (e.g., X, Y, and/or Z). Similarly, "at least one of X, Y, and Z," unless specifically stated otherwise, is to be understood to present that an item, term, etc., can be either X, Y, and Z, or any combination thereof (e.g., X, Y, and/or Z). Thus, as used herein, such phrases are not generally intended to, and should not, imply that certain embodiments require at least one of either X, Y, or Z to be present, but not, for example, one X and one Y. Further, such phrases should not imply that certain embodiments require each of at least one of X, at least one of Y, and at least one of Z to be present.

Although embodiments have been described herein in detail, the descriptions are by way of example. The features of the embodiments described herein are representative and, in alternative embodiments, certain features and elements may be added or omitted. Additionally, modifications to aspects of the embodiments described herein may be made by those skilled in the art without departing from the spirit and scope of the present invention defined in the following claims, the scope of which are to be accorded the broadest interpretation so as to encompass modifications and equivalent structures.

Therefore, at least the following is claimed:

1. A system comprising:
a file system stored in a storage device, the file system comprising a plurality of files and a plurality of file system data structures individually corresponding to a respective one of the plurality of files, individual ones of the plurality of file system data structures comprising a respective user space accessible data portion and a respective kernel level only accessible portion; and
at least one computing device configured to perform a boot of an operating system, wherein the at least one computing device is further configured to at least:
modify, from a default value, a subset of a respective plurality of flags in the respective kernel level only accessible portion for each of the plurality of files, wherein the subset of the respective plurality of flags are unused by the file system;
receive a configuration request to change a subset of a plurality of flags associated with a particular file of the plurality of files;
determine a hardware address corresponding to an origin of the configuration request matches a predetermined hardware address;
in response to determining that the hardware address matches the predetermined hardware address, update the subset of the plurality of flags based at least in part on the configuration request;
receive an execution request to execute a requested program corresponding to the particular file of the plurality of files stored in the file system, the plurality of flags being stored in the respective kernel level only accessible portion;
load a file system data structure of the plurality of file system data structures corresponding to the particular file;
determine an action to take based at least in part on the subset of the plurality of flags stored in the respective kernel level only accessible portion of the file system data structure, the file system being configured to set the action to not executing the requested program when the subset of the plurality of flags for the particular file has been set to the default value as a result of at least one of: modification, creation, or copying; and
perform the action.

2. The system of claim 1, wherein the at least one computing device is configured to at least determine that the execution request originated from user space based at least in part on a data structure existing in memory, wherein the action to take is further based at least in part on the execution request originating from user space.

3. The system of claim 1, wherein code that determines the action to take based at least in part on the plurality of flags stored is contained in a kernel add-on module.

4. The system of claim 1, wherein a respective at least two bits from the respective kernel level only accessible portion from the individual ones of the plurality of file system data structures are tested to determine which action to perform, the action to perform being one of: do not run the requested program, run the requested program only if requested from kernel space, run the requested program only if requested from user space, or run the requested program.

5. The system of claim 1, wherein the at least one computing device is configured to at least:
query a plurality of global memory flags embedded within the operating system during the boot of the operating system to determine a current stage in the boot of the operating system;
identify at least one operating system tool available based at least in part on the current stage in the boot of the operating system;
determine at least one required operating system tool necessary to execute the requested program; and
determine whether the at least one required operating system tool is available based at least in part on the at least one operating system tool, wherein the action is further based at least in part on whether the at least one operating system tool is available.

6. The system of claim 1, wherein the default value is zero.

7. A non-transitory computer readable medium embodying a program that, when executed by at least one computing device, causes the at least one computing device to at least:
modify, from a default value, a subset of a respective plurality of flags in a respective kernel level only accessible portion for a particular program, wherein the subset of the respective plurality of flags are unused by the file system;
receive a configuration request to change a subset of a plurality of flags associated with the particular program;
determine a hardware address corresponding to an origin of the configuration request matches a predetermined hardware address;
in response to determining that the hardware address matches the predetermined hardware address, update the subset of the plurality of flags based at least in part on the configuration request;
receive an execution request to execute the particular program stored in the file system;
receive a file system data structure corresponding to the particular program, the file system data structure comprising a user space accessible data portion and a kernel level only accessible portion, the plurality of flags being stored in the kernel level only accessible portion;
determine an action to take based at least in part on the subset of the plurality of flags stored in the kernel level only accessible portion, the plurality of flags defaulting to the action being not executing the particular program when the subset of the respective plurality of flags of the particular program has been set to the default value; and
perform the action.

8. The non-transitory computer readable medium of claim 7, wherein the program further causes the at least one computing device to at least:
determine that the execution request originates from user space, wherein the action corresponds to not executing the particular program;
receive a second execution request to execute the particular program stored in the file system;
determine that the second execution request originates from kernel space; and
determine to execute the particular program based at least in part on the plurality of flags stored in the kernel level only accessible portion and the second execution request originating from kernel space.

9. The non-transitory computer readable medium of claim 7, wherein the hardware address associated with the configuration request matches the predetermined hardware address when the configuration request originates from a secured application and a device is physically connected to the at least one computing device via a non-networked connection.

10. The non-transitory computer readable medium of claim 7, wherein the configuration request is configured to enable two step authentication for program execution for a number of minutes, wherein the number of minutes is determined based at least in part on data included in the configuration request.

11. The non-transitory computer readable medium of claim 7, wherein the file system data structure is an Mode object.

12. The non-transitory computer readable medium of claim 7, wherein the program further causes the at least one computing device to at least determine that the configuration request originated from a secured application based at least in part on determining that the hardware address corresponding to the origin of the configuration request matches the predetermined hardware address.

13. A method comprising:
modifying, from a default value, a subset of a respective plurality of flags in a respective kernel level only accessible portion for a particular program, wherein the subset of the respective plurality of flags are unused by the file system;
receiving, by at least one computing device via an operating system, a configuration request to change a subset of a plurality of flags associated with the particular program;
determining, by the at least one computing device, a hardware address corresponding to an origin of the configuration request matches a predetermined hardware address;
in response to determining that the hardware address matches the predetermined hardware address, updating, by the at least one computing device, the subset of the plurality of flags based at least in part on the configuration request;
receiving, by the at least one computing device, an execution request to execute the particular program stored in a file system;
receiving, by the at least one computing device, a file system data structure corresponding to the particular program, the file system data structure comprising a user space accessible data portion and a kernel level only accessible portion;
determining, by the at least one computing device, an action to take based at least in part on a plurality of flags stored in the kernel level only accessible portion, the plurality of flags defaulting to the action being not executing the particular program when any of the subset of the plurality of flags of the particular program have been set to the default value; and
performing, by the at least one computing device, the action.

14. The method of claim 13, further comprising determining, by the at least one computing device, that a plurality of services required to execute the particular program are available based at least in part on a first plurality of kernel flags, wherein performing the action occurs in response to determining that the plurality of services required to execute the particular program are available.

15. The method of claim 13, further comprising:
determining, by the at least one computing device, that the execution request originated from user space; and
in response to determining that the execution request originated from user space, determining; by the at least one computing device, whether the execution request originated from a secure user space application.

16. The method of claim 13, wherein the file system automatically sets the plurality of flags for a modified program to a default action of never executing the modified program whenever a change occurs to the modified program.

17. The method of claim 13, further comprising:
enabling, by the at least one computing device, a configuration mode of the operating system by modifying a configuration setting;
booting, by the at least one computing device, the operating system in the configuration mode;
receiving, by the at least one computing device, a plurality of additional execution request to execute a plurality of programs stored in the file system;

receiving, by the at least one computing device, a plurality of additional file system data structures individually corresponding to a respective one of the plurality of programs, the plurality of additional file system data structures comprising a respective user space accessible data portion and a respective kernel level only accessible portion; and executing, by the at least one computing device; the plurality of programs.

18. The method of claim 17, further comprising logging, by the at least one computing device, information associated with the plurality of additional execution requests.

19. The method of claim 17, further comprising updating, by the at least one computing device, a respective additional plurality of flags in the respective kernel level only accessible portion for each of the plurality of programs to enable execution of the plurality of programs when the configuration mode of the operating system is disabled.

20. The method of claim 13, further comprising determining, by the at least one computing device, a location of the at least one computing device, wherein determining the action to take is further based at least on part on the location of the at least one computing device being within a predefined geographical area.

* * * * *